UNITED STATES PATENT OFFICE.

JAMES W. CARR, OF LAKELAND, FLORIDA.

WOOD-PRESERVING COMPOUND.

1,150,499.  Specification of Letters Patent.  Patented Aug. 17, 1915.

No Drawing.  Application filed August 3, 1914. Serial No. 854,727.

*To all whom it may concern:*

Be it known that I, JAMES W. CARR, a citizen of the United States, residing at Lakeland, in the county of Polk and State of Florida, have invented certain new and useful Improvements in Wood-Preserving Compounds, of which the following is a specification.

This invention relates to a liquid composition for preserving wood.

In carrying out my invention, I mix substantially equal parts of the following ingredients: pine tar, linseed oil, kerosene oil, and rosin oil, to which may be added a suitable coloring matter. Rosin oil, distilled from rosin and having about three or four per cent. of linseed oil added is sometimes locally known among turpentine operators as dead oil, although totally different from the well known dead oil derived from gas tar. It is the rosin oil thus treated that I prefer to use as an ingredient of my paint.

In mixing the ingredients to form the compound, the pine tar and linseed oil are placed in a suitable vessel and stirred until thoroughly mixed. The rosin oil is then added and the stirring is continued until these three ingredients are well mixed; the kerosene is then added and the mixture again well stirred. If desired, suitable coloring matter may be added and incorporated in the compound by stirring.

One of the principal objects of my invention is to provide a paint, having pine tar as an ingredient, which will penetrate wood and carry the pine tar into its interstices to preserve the wood. Pine tar alone will not penetrate the wood. Kerosene will penetrate, but, I have found that kerosene will not mix with the pine tar alone so as to form a penetrating mixture of the two, as, when these two ingredients are stirred together, the pine tar forms in balls or lumps. I have also found that if the pine tar, linseed oil, and rosin oil, or "dead oil," derived from rosin, are mixed as described and the kerosene is then added and stirred in, the kerosene will mix readily with the pine tar and other ingredients, and a penetrating paint is thus formed.

The paint has a glossy finish, does not crack or peel off of wooden surfaces, and because of the penetration frequent applications of the compound are not necessary. It may also be used on surfaces other than wood, but its principal function is as a wood preserving paint.

What I claim is:

1. A compound for preserving wood comprising a liquid mixture of pine tar, linseed oil, rosin oil, and kerosene oil.

2. A compound for preserving wood comprising substantially equal proportions of pine tar, linseed oil, rosin oil, and kerosene oil.

3. The method of making a penetrating wood-preserving compound containing pine tar, as a preserving agent, and kerosene as a penetrating vehicle, which comprises, first mixing the pine tar with linseed and rosin oils, and then adding kerosene to the mixture.

In testimony whereof I have affixed my signature, in presence of two witnesses.

JAMES W. CARR.

Witnesses:
 J. L. SKIPPER,
 R. N. SKIPPER.

Copies of this patent may be obtained for five cents each, by addressing the "Commissioner of Patents, Washington, D. C."